July 23, 1929.                J. M. KARRASCH                1,721,598
TAIL STRUCTURE FOR AEROPLANES
Filed July 31, 1928        3 Sheets-Sheet 1
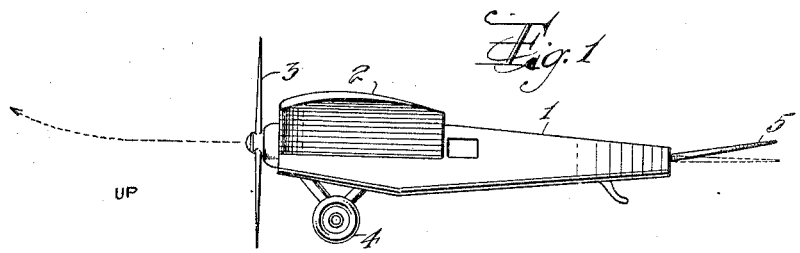
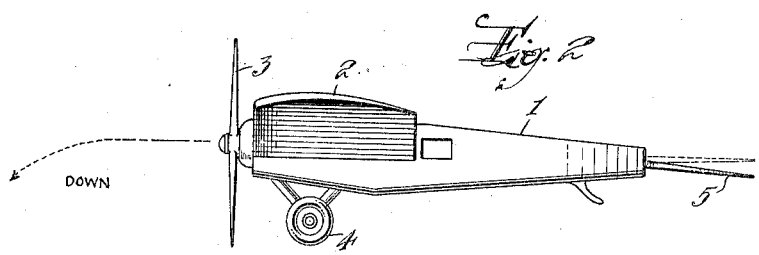
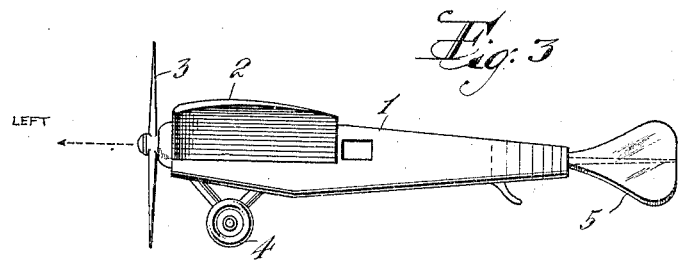
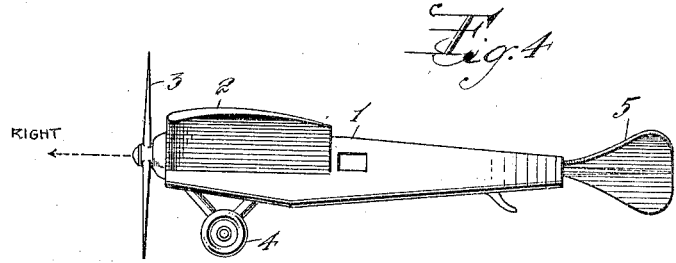
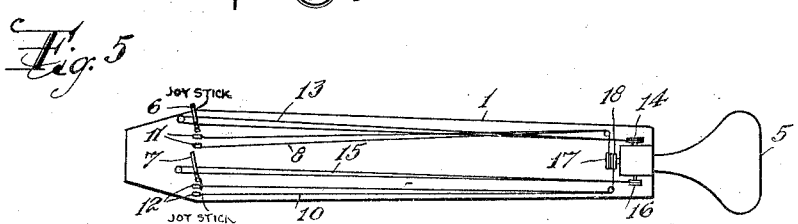
INVENTOR
Julius M. Karrasch
BY
George D. Richards
ATTORNEY July 23, 1929.  J. M. KARRASCH  1,721,598
TAIL STRUCTURE FOR AEROPLANES
Filed July 31, 1928  3 Sheets-Sheet 2
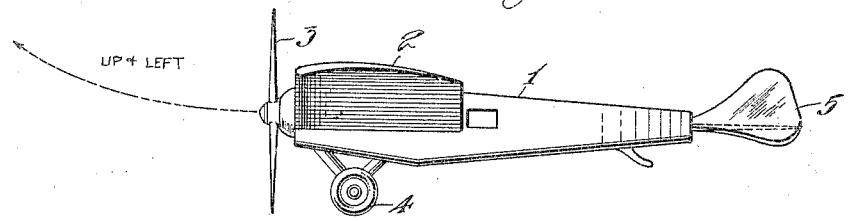
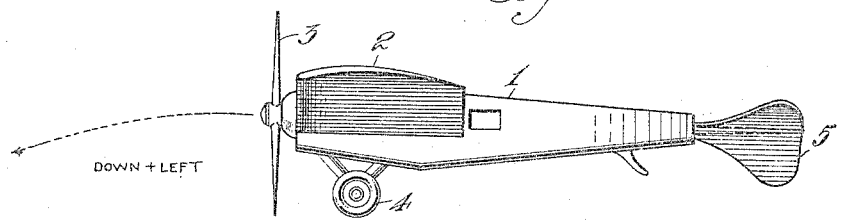
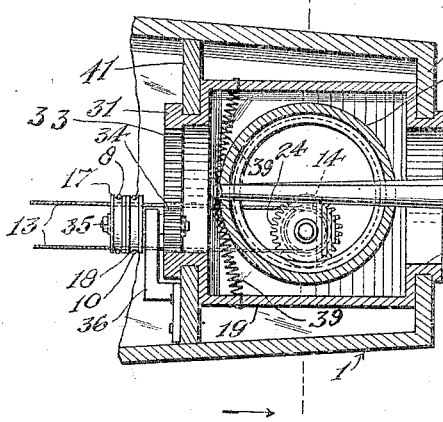
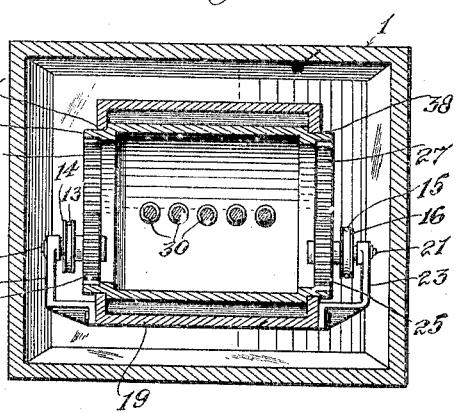
INVENTOR
Julius M. Karrasch
BY
George D. Richards
ATTORNEY

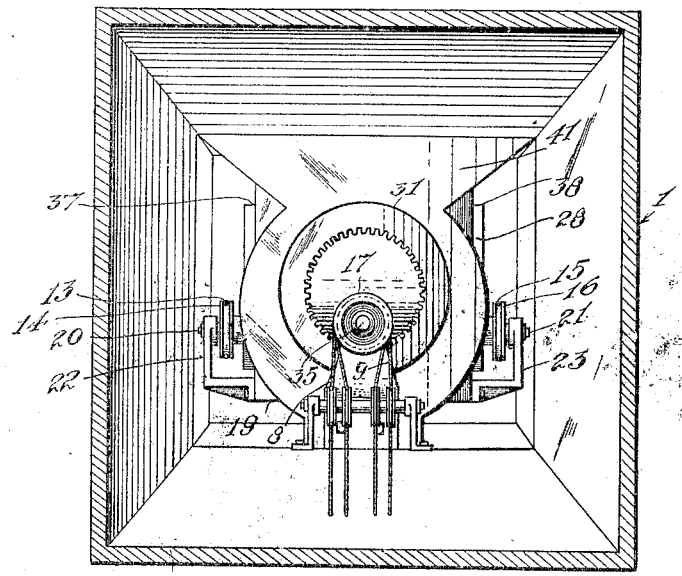
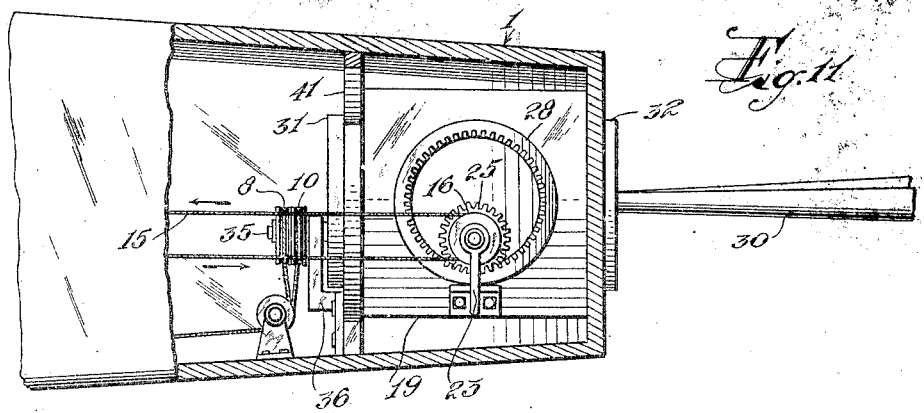

Patented July 23, 1929.

1,721,598

UNITED STATES PATENT OFFICE.

JULIUS M. KARRASCH, OF ORANGE, NEW JERSEY.

TAIL STRUCTURE FOR AEROPLANES.

Application filed July 31, 1928. Serial No. 296,523.

This invention relates to steering mechanisms and particularly to steering mechanisms for aeroplanes.

In the steering mechanism of this invention, a single tail member or rudder is used for steering the aeroplane to the right or left as well as to cause it to ascend or descend. In order for a single tail member to effect the steering of the aeroplane in any desired direction, it is necessary for this member to be universally connected with the main body of the aeroplane, and adequate operating means must be provided for moving the tail member to any desired position against the pressure of a strong wind and for holding such tail member rigidly in such position. Difficulty has been encountered in the past in producing a steering mechanism of sufficient rigidity and at the same time possessing sufficient flexibility in operation as to enable the tail member to be moved to any desired angle quickly and positively and then held rigidly in such position.

The principal object of this invention is to provide a practical steering mechanism of the above character that is of strong yet light construction and wherein the several parts are so constructed and arranged as to provide a rigid support for the tail member regardless of the angular position of this member and wherein simple and positive means are utilized for moving the various parts of the mechanism as desired.

Other objects and advantages will become apparent from the specification, taken in connection with the accompanying drawings wherein the invention is embodied in concrete form.

In the drawings:

Figure 1 is a side view of an aeroplane equipped with the steering mechanism of the invention, and illustrates the tail of the aeroplane positioned so as to cause the aeroplane to ascend;

Figure 2 is a view similar to Figure 1, and illustrates the tail of the aeroplane positioned so as to cause the aeroplane to descend;

Figure 3 is a view similar to Figure 1, and illustrates the tail of the aeroplane positioned so as to cause the aeroplane to turn to the left;

Figure 4 is a view similar to Figure 1, and illustrates the tail of the aeroplane positioned so as to cause the aeroplane to turn to the right;

Figure 5 is a schematic plan view of the aeroplane with parts omitted to illustrate the steering mechanism;

Figure 6 is a view similar to Figure 1, and illustrates the tail of the aeroplane positioned so as to cause the aeroplane to ascend while turning to the left at the same time;

Figure 7 is a view similar to Figure 1 and illustrates the tail of the aeroplane positioned so as to cause the aeroplane to descend while turning to the left;

Figure 8 is an enlarged, vertical central view of a portion of the rear of the aeroplane, and illustrates a portion of the steering mechanism;

Figure 9 is a sectional view taken along line 8—8 of Figure 7;

Figure 10 is an enlarged, vertical transverse view of a portion of the rear of the aeroplane; and Figure 11 is an enlarged, portion of the rear of the aeroplane with parts broken away.

Referring to Figures 1 to 7 of the drawings, the aeroplane 1 has wings 2, propeller 3, landing gear 4 and tail 5. The tail 5 is adapted to be turned into any one of a plurality of angular positions with respect to the longitudinal axis of the aeroplane, thereby causing the aeroplane to move in any desired direction.

The aeroplane is illustrated in Figure 5 as having a dual control system. This control system comprises joy sticks 6 and 7 that are adapted to control the vertical movement of the aeroplane, and steering wheels (not shown) that are connected to cables 8 and 10 which pass under pairs of sheaves 11 and 12 for controlling the transverse movement of the aeroplane. A cable 13 has its lower run secured to the joy stick 6 and passes around a suitable guide sheave to the rear of the aeroplane where it extends one or more times around a pulley 14. A similar cable 15 has its lower run secured to the joy stick 7 and passes around a guide sheave to the rear of the aeroplane where it extends around a pulley 16. Cable 8 is suitably guided along the aeroplane to the rear thereof where it extends around a pulley 17. Likewise cable 10 is guided to the rear of the aeroplane when this cable extends around a pulley 18.

As illustrated in Figures 8 to 11, the pulleys 14 and 16 are rotatably mounted upon stub shafts 20 and 21 that are carried by brackets 22 and 23 secured to a casing 19. A pinion 24 is formed integral with the pulley 14 and a pinion 25 is also formed integral with pulley 16. Pinions 24 and 25 mesh with internal gears 26 and 27, respectively, that are provided on the interior end portions of a hollow drum 28. Drum 28 has a plurality of longitudinally spaced apertures extending through its opposite walls. The ribs 30 of the tail 5 extend through an opening 29 provided in the casing 19 and through these apertures in the drum 28 and are rigidly secured within these apertures. A plurality of centering tension springs 39 have certain of their ends secured to the ends of ribs 30 and the other of their ends secured to the casing 19 and tend to maintain the tail 5 in a horizontal position, thereby relieving the aeroplane operator of the necessity of constantly holding the tail in a horizontal position during normal horizontal flight. The surface coverings of the tail 5 are secured to the ribs 30 and these coverings extend parallel to the longitudinal axis of the drum 28. The drum 28 is of relative large diameter and of considerable length, thereby possessing great rigidity for positively supporting the tail 5. The end portions of the drum 28 are reduced slightly and extend through large aligned bearings 37 and 38 provided in the casing 19. Drum 28 is adapted to turn within bearings 37 and 38 during certain movement of the tail 5. The large bearing surfaces provided by the bearings 37 and 38 cause the drum 28 to be rigidly supported within the casing 19 regardless of the wind load upon the tail 5.

Casing 19 has large hollow trunnions 31 and 32 that extend from its front and rear respectively. These trunnions extend at right angles to the bearings 37 and 38 and in the direction of the longitudinal centerline of the fuselage of aeroplane 1. Trunnion 32 is rotatably supported in a large bearing provided in the end panel 40 of the aeroplane 1. The opening 29 extends through trunnion 32 and permits the tail 5 to move with respect to casing 19. Trunnion 31 is rotatably supported in a large bearing provided in a panel 41 that is rigidly secured to the aeroplane fuselage. Trunnion 31 is provided on its interior with an internal gear 33. The gear 33 meshes with a pinion 34 that is secured to a shaft 35. Shaft 35 is rotatably mounted in a bearing that is provided in a bracket 36 secured to the panel 41. The pulleys 17 and 18 are mounted upon the shaft 35 and are fixed to this shaft.

In operation, by manipulating either joy stick 6 or joy stick 7 the aeroplane may be caused to ascend or descend. By manipulating either of the steering wheels connected with cables 8 and 10 in conjunction with either of the joy sticks, the aeroplane may be caused to turn or to ascend or descend while turning.

Since joy sticks 6 and 7 are manipulated similarly, the manipulation of only one of these joy sticks, namely, joy stick 6 will be described. The joy sticks and steering wheels may be assumed to be in their control and neutral positions so that the tail 5 is in its neutral position. Assume that the joy stick 6 is then pulled to the rear by the operator of the aeroplane. This movement of the joy stick 6 causes the cable 13 to move and turn the pulley 14 in a counter clockwise direction as viewed in Figure 8. Pinion 24, acting through internal gear 26, causes drum 28 to also revolve in a counter-clockwise direction as viewed in Figure 8. Tail 5 being carried by drum 28 is thus moved to an upwardly inclined position, as illustrated in Figure 1, thereby causing the plane to ascend. Should the operator have pushed the joy stick 6 forward instead of to the rear, the drum 28 would have been revolved in the opposite direction and the tail 5 would have been moved to a downwardly inclined position, as illustrated in Figure 2, thereby causing the plane to descend.

If it is desired to turn the aeroplane to the right or left, the steering wheel adjacent the joy stick 6 may be turned, thereby causing the cable 8 to turn the pulley 17, pinion 34 and internal gear 33 and effect the revolving of the casing 19 within its bearings in the panels 40 and 41. Drum 28, being carried by casing 19, turns with this casing causing the tail 5 to turn also, so that its operating surfaces turn from a horizontal plane toward the vertical. If the joy stick 6 is now manipulated, the aeroplane may be either turned to the left as shown in Figure 3 or to the right as shown in Figure 4, depending upon the direction of motion of the steering wheel and joy stick.

By various partial movements of the joy stick and steering wheel, the tail 5 may be caused to assume any angle desired, thereby enabling the aeroplane to turn while ascending or descending. Thus, in Figure 6 the tail 5 is positioned so as to cause the aeroplane to turn towards the left and ascend at the same time, while in Figure 7, it likewise causes the aeroplane to descend while turning towards the left.

The large bearings 37 and 38 rigidly support the drum 28 within the casing 19 and the large bearings in the panels 40 and 41 likewise rigidly support the casing 19 within the fuselage of the aeroplane 1, so that regardless of the position of the tail 5 or the magnitude of the wind pressure exerted upon this tail it is rigidly supported at all times.

The direct connection of the pulleys 14, 16 and 17 by means of the cables 8, 10, 13 and 15 to the joy sticks and steering wheels causes any movement of the latter members to immediately actuate the tail 5 without appreciable lost motion.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A steering mechanism for air craft comprising, a rotatable casing, oppositely extending hollow trunnions provided on said casing, bearings carried by said air craft for supporting said trunnions, bearings provided in said casing and extending at right angles to said trunnions of said casing, a rotatable drum, said rotatable drum having its ends supported in said bearings in said casing, a tail member extending through one of said trunnions and carried by said drum, and means for rotating said casing within its bearings in said air craft and said drum within its bearings in said casing for causing the operation of said tail member.

2. A steering mechanism for air craft comprising, a tail member, a rotatable casing having its axis of rotation extending in the direction of the longitudinal axis of said air craft and arranged to support said tail member, said rotatable casing having trunnions supported in bearings provided in the frame work of said air craft, an internal gear provided on one of said trunnions, a pinion for driving said gear, and cable means for operating said pinion to cause said casing to rotate, thereby actuating said tail member.

3. A steering mechanism for air craft comprising, a rotatable casing having trunnions extending in the direction of the length of said aircraft, bearings provided in said air craft for supporting said trunnions, an internal gear provided on one of said trunnions, a pinion for driving said internal gear, cable means for operating said pinion, bearings provided in said casing and extending at right angles to said bearings in said air craft, a rotatable drum supported in the bearings in said casing, a tail rigidly supported by said drum and having operating surfaces extending parallel to the longitudinal axis of said drum, an internal gear provided in one end of said drum, a pinion for driving said internal gear provided in said drum, and cable means for operating said last named pinion, said plural cable means acting through said pinions and said internal gears to revolve said casing and said drum to effect an universal movement of said tail.

4. A steering mechanism for aeroplanes, comprising, a casing, hollow trunnions formed on said casing and extending in the direction of the centerline of the aeroplane fuselage, panels provided in said fuselage and having bearings supporting said trunnions, a hollow drum positioned within said casing and extending at right angles to said trunnions, said drum having reduced end portions mounted in bearings in said casing, a tail member extending through one of said hollow trunnions and secured within apertures in the walls of said drum, gearing for rotating said casing and gearing for rotating said drum within said casing, whereby said tail member may be moved as desired.

In testimony, that I claim the invention set forth above I have hereunto set my hand this 18th day of May, 1928.

JULIUS M. KARRASCH.